(12) United States Patent
Kim et al.

(10) Patent No.: US 7,649,582 B2
(45) Date of Patent: Jan. 19, 2010

(54) ARRAY SUBSTRATE FOR A LIQUID CRYSTAL DISPLAY DEVICE HAVING MULTI-LAYERED METAL LINE AND FABRICATING METHOD THEREOF

(75) Inventors: Myung-Joon Kim, Dae-gu (KR); Hu-Kag Lee, Gumi-si (KR); Beung-Hwa Jeong, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 154 days.

(21) Appl. No.: 11/783,407

(22) Filed: Apr. 9, 2007

(65) Prior Publication Data

US 2007/0273805 A1    Nov. 29, 2007

Related U.S. Application Data

(62) Division of application No. 10/327,084, filed on Dec. 24, 2002, now abandoned.

(30) Foreign Application Priority Data

Dec. 28, 2001  (KR) .............................. 2001-87618
Dec. 31, 2001  (KR) .............................. 2001-89325

(51) Int. Cl.
G02F 1/136    (2006.01)
G02F 1/1343   (2006.01)

(52) U.S. Cl. ............................ 349/43; 349/139; 257/72

(58) Field of Classification Search ............ 349/41–43; 257/59, 72
See application file for complete search history.

(56) References Cited

U.S. PATENT DOCUMENTS

| | | | | |
|---|---|---|---|---|
| 4,778,560 A | * | 10/1988 | Takeda et al. | ............... 438/158 |
| 5,150,233 A | | 9/1992 | Enomoto et al. | |
| 5,334,860 A | * | 8/1994 | Naito | ........................... 257/59 |
| 5,547,896 A | | 8/1996 | Linn et al. | |
| 5,610,738 A | | 3/1997 | Sasano et al. | |
| 5,621,556 A | | 4/1997 | Fulks et al. | |
| 6,087,678 A | | 7/2000 | Kim | |
| 7,479,451 B2 | * | 1/2009 | Harano et al. | ............... 438/656 |

FOREIGN PATENT DOCUMENTS

| | | |
|---|---|---|
| JP | 06-202148 | 7/1994 |
| JP | 10-178018 | 6/1998 |
| JP | 2000-054163 | 2/2000 |
| KR | 1999-083510 | 11/1999 |

* cited by examiner

*Primary Examiner*—Dung T. Nguyen
(74) *Attorney, Agent, or Firm*—McKenna Long & Aldridge

(57) ABSTRACT

An array substrate for a liquid crystal display device includes: a substrate; a gate electrode and a gate line on the substrate; a gate insulating layer on the gate electrode and the gate line; an active layer on the gate insulating layer; an ohmic contact layer on the active layer; source and drain electrodes and a data line on the ohmic contact layer, the source and drain electrodes and the data line having a multiple metal layer; a passivation layer on the source and drain electrodes and the data line; and a pixel electrode on the passivation layer.

9 Claims, 17 Drawing Sheets

ARRAY SUBSTRATE FOR A LIQUID CRYSTAL DISPLAY DEVICE HAVING MULTI-LAYERED METAL LINE AND FABRICATING METHOD THEREOF

This is a divisional application of application Ser. No. 10/327,084, filed 24 Dec. 2002 now abandoned which claims the benefit of Korean Patent Application No. 2001-87618, filed 28 Dec. 2001 and Korean Patent Application No. 2001-89325, filed 31 Dec. 2001, which are hereby incorporated by reference for all purposes as if fully set forth herein.

BACKGROUND OF THE INVENTION

1. Field of the Invention

The present invention relates to a liquid crystal display (LCD) device, and more particularly to an array substrate for an LCD device having a multi-layered metal line.

2. Discussion of the Related Art

Flat panel display (FPD) devices having small size, lightweight, and low power consumption have been a subject of recent research in the coming of the information age. Among many kinds of FPD devices, LCD devices are widely developed and used for notebook and desktop personal computers (PCs) because of their excellent characteristics of resolution, color display and display quality.

Generally, an LCD device includes an upper substrate and a lower substrate facing each other with liquid crystal molecules interposed therebetween. Each substrate has an electrode on an inner surface thereof. An electric field is generated by applying a voltage to the electrodes, thereby driving the liquid crystal molecules to display images depending on light transmittance through the liquid crystal molecules. The lower substrate, which includes thin film transistors (TFTs) to apply a signal to pixel electrodes on the lower substrate, is formed by repeating deposition and patterning steps of a thin film. The upper substrate includes a color filter layer where red (R)/green (G)/blue (B) colors are alternately disposed. The color filter layer can be formed by a dyeing method, a printing method, a pigment dispersion method or an electro-deposition method.

FIG. 1 is a schematic cross-sectional view of a related art liquid crystal display device. As shown in FIG. 1, first and second substrates 21 and 71 face and are spaced apart from each other. A gate electrode 23 of a conductive material such as metal is formed on an inner surface of the first substrate 21 and a gate insulating layer 29 of silicon nitride (SiNx) or silicon oxide ($SiO_2$) covers the gate electrode 23. An active layer 31 of amorphous silicon is formed on the gate insulating layer 29 over the gate electrode 23 and an ohmic contact layer 33a and 33b of impurity-doped amorphous silicon is formed on the active layer 31. Source and drain electrodes 41 and 43 of a conductive material such as metal are formed on the ohmic contact layer 33a and 33b. The source and drain electrodes 41 and 43 constitute a thin film transistor (TFT) "T" with the gate electrode 12. A passivation layer 51 of SiNx, $SiO_2$ or organic insulating material is formed on the source and drain electrodes 41 and 43. The passivation layer 51 has a drain contact hole 53 therethrough exposing the drain electrode 43. A pixel electrode 61 of a transparent conductive material is formed on the passivation layer 51 at a pixel region (not shown) and connected to the drain electrode 43 through the drain contact hole 53.

A black matrix 73 corresponding to the TFT "T" is formed on an inner surface of the second substrate 71. The black matrix 73 prevents a light leakage of an exterior of the pixel electrode 61 and a photo current generation by shielding light from being incident on a channel of the TFT "T." A color filter layer 75a and 75b having alternating colors of red (R), green (G) and blue (B) is formed on the black matrix 73. Here, one color of the color filter layer 75a and 75b corresponds to one pixel region (not shown). A common electrode 77 of a transparent conductive material is formed on the color filter layer 75a and 75b.

A liquid crystal layer 81 is interposed between the pixel electrode 61 and the common electrode 77.

Here, the first substrate 21 is referred to as an array substrate and illustrated in FIG. 2.

FIG. 2 is a schematic plan view of an array substrate for a related art liquid crystal display device. As shown in FIG. 2, thin film transistors (TFTs) "T" in a matrix are formed on a substrate 21, referred to as an array substrate. The TFTs act as switching devices. Each TFT "T" includes a gate electrode 23, an active layer 31 over the gate electrode 23, and source and drain electrodes 41 and 43. Moreover, each TFT "T" is connected to a gate line 25 and a data line 45. A gate pad 27 wider than the gate line 25 is formed at one end of the gate line 25 and a data pad 49 wider than the data line 45 is formed at one end of the data line 45. A gate pad terminal 63 and a data pad terminal 65, which are input means of an external signal, are connected to the gate pad 27 and the data pad 49, respectively. Here, a pixel region "P" is defined by the gate line 25 and the data line 45. A storage capacitor "C" is formed over a portion of the gate line 25 and connected in parallel to a transparent pixel electrode 61 of the pixel region "P." The storage capacitor "C" uses the portion of the gate line 25 as a first capacitor electrode and a source-drain metal layer 47 as a second capacitor electrode. The source-drain metal layer 47 of the same material as the drain electrode 43 is disposed over the portion of the gate line 25 and connected to the pixel electrode 61 through a capacitor contact hole 55.

FIG. 3 is a schematic cross-sectional view taken along the line III-III of FIG. 2. As illustrated in FIG. 3, a gate electrode 23, a gate line 25 and a gate pad 27 at one end of the gate line 25 are formed on a substrate 21. A gate insulating layer 29, i.e., a first insulating layer, is formed on an entire surface of the substrate 21. An active layer 31 and an ohmic contact layer 33 of an island shape are formed on the gate insulating layer 29 over the gate electrode 23. Source and drain electrodes 41 and 43 contacting the ohmic contact layer 33 are formed on the ohmic contact layer 33. A data line 45 is connected to the source electrode 41 and a data pad 49 is formed at one end of the data line 45. A source-drain metal layer 47 of an island shape is formed over a portion of the gate line 25. Here, the data line 45, and the source and drain electrodes 41 and 43 have a single layer of chromium (Cr) or molybdenum (Mo). A passivation layer 51, i.e., a second insulating layer, is formed on the data line 45, and the source and drain electrodes 41 and 43. A drain contact hole 53 is formed through the passivation layer 51. A transparent pixel electrode 61 is formed on the passivation layer 51 and connected to the drain electrode 43 through the drain contact hole 53.

When the data line 45 having a single layer of Cr or Mo are used for a large size substrate, images of a uniform display quality cannot be obtained over an entire surface of a liquid crystal panel due to a high resistance of the Cr or Mo. Accordingly, the size of the substrate may be limited. As a resistance of the data line 45 becomes lower, signals flow better through the data line 45, and the data line 45 is more suitable for a large size substrate. Therefore, it is necessary to form the data line 45 out of a low resistance material. Generally, an aluminum (Al) line is used as a low resistance line. However, since the Al line is susceptible to chemicals, and hillock formation often occurs in the Al line, a single layer of aluminum has some disadvantages. Therefore, a data line 45 having a triple layer such as Mo/Al/Mo is suggested.

FIGS. 4A to 4E are schematic cross-sectional views illustrating a fabricating process of an array substrate using a triple layer. FIGS. 4A to 4E are also taken along a line III-III of FIG. 2.

In FIG. 4A, a gate electrode 23, a gate line 25 and a gate pad 27 at one end of the gate line 25 are formed on a substrate 21. Generally, the gate electrode 23, the gate line 25 and the gate pad 27 have a double layer including aluminum (Al). For example, Al may be used as a first metal layer, and Mo or Cr may be used as a second metal layer. Even though aluminum has low resistance, aluminum is susceptible to chemicals and line defect due to a hillock occurring during a subsequent high temperature process. Accordingly, Mo or Cr having high corrosion resistance is used as the second layer on the first layer. A gate insulating layer 29, i.e., a first insulating layer, is formed on an entire surface of the substrate 21. The gate insulating layer 29 has one of an inorganic insulating material group including silicon nitride (SiNx) and silicon oxide ($SiO_2$). An active layer 31 and an ohmic contact layer 33 of an island shape are formed on the gate insulating layer 29 over the gate electrode 23. The active layer 31 and the ohmic contact layer 33 include intrinsic amorphous silicon (a–Si:H) and impurity-doped amorphous silicon (n+a–Si:H), respectively.

In FIG. 4B, a first metal layer 35 of Mo, a second metal layer 37 of Al and a third metal layer 39 of Mo are sequentially formed on an entire surface of the substrate 21. The first metal layer 35 is used to prevent a spiking in which the second metal layer 37 penetrates the active layer 31 or the ohmic contact layer 33. The third metal layer 39 is used to reduce a contact resistance between the second metal layer 37 and a pixel electrode (not shown) of a subsequent process.

In FIG. 4C, source and drain electrodes 41 and 43, a data line 45 and a data pad 49 are formed through patterning a triple layer of the first, second and third metal layers 35, 37 and 39. The source and drain electrodes 41 and 43 are spaced apart from each other. The source electrode 41 is connected to the data line 45, and the data pad 49 is disposed at one end of the data line 45. At the same time, a source-drain metal layer 47 of an island shape is formed on the gate insulating layer 29 over a portion of the gate line 25. Sequentially, the active layer 33 is exposed through etching the ohmic contact layer 33 between the source and drain electrodes 41 and 43.

In FIG. 4D, a passivation layer 51, i.e., a second insulating layer, is formed on an entire surface of the substrate 21. The passivation layer 51 has a drain contact hole 53 therethrough exposing the drain electrode 43, a gate pad contact hole 57 exposing the gate pad 27, a data pad contact hole 59 exposing the data pad 49 and a capacitor contact hole 55 exposing the source-drain metal layer 47.

In FIG. 4E, a pixel electrode 61 is formed on the passivation layer 51 through deposing and patterning one of a transparent conductive metal group including indium-tin-oxide (ITO) and indium-zinc-oxide (IZO). The pixel electrode 61 is connected to the drain electrode 43 and the source-drain metal layer 47.

However, when a triple layer is applied to source and drain electrodes and a data line, a metal residue causing an inferiority of an LCD device remains during deposing and patterning process of three metal layers. These problems will be illustrated in FIGS. 5A to 6C.

FIGS. 5A to 5D are schematic cross-sectional views illustrating a metal residue generation of three metal layers, and FIGS. 6A to 6C are scanning electron microscope (SEM) images showing a surface state according to a step of a patterning process.

In FIG. 5A, first, second and third metal layers 35, 37 and 39 are sequentially formed on a substrate 21 including a gate line 23 and a gate insulating layer 29 by using a sputtering method. Here, since the first metal layer 35 has a thickness less than about 100 Å, the first metal layer 35 has pinholes at a step portion "A" of the gate insulating layer 29. Accordingly, when the second metal layer 37 is deposited on the first layer 35, the second metal layer 37 is diffused into the first metal layer 35 through the pinholes at the step portion "A." Next, the first, second and third metal layers 35, 37 and 39 are patterned to form source and drain electrode (not shown) and a data line (not shown) through a photolithographic process using a photoresist (PR) pattern (not shown) as an etching mask.

In FIG. 5B, the third and second metal layers 37 and 39 are etched. Here, since the second metal layer 37 is diffused into the first metal layer 35 at the step portion "A" during the depositing process, the second metal layer 37 of the step portion "A" is not eliminated. Accordingly, the first and second metal layers 35 and 37 coexist at the step portion "A." This surface state after etching the second metal layer 37 is shown in FIG. 6A.

In FIG. 5C, the first metal layer 35 is etched. However, since the first and second metal layers 35 and 37 coexist at the step portion "A," the first metal layer 37 of the step portion "A" is not eliminated. This etching result is referred to as an under etch. This surface state after etching the first metal layer 35 is shown in FIG. 6B.

In FIG. 5D, after an ohmic contact layer (not shown) between the source and drain electrodes (not shown) is etched, the PR pattern is removed. Here, the gate insulating layer 29 is slightly etched. However, even after the ohmic contact layer (not shown) is etched, the first and second metal layers 35 and 37 of the step portion "A" are not eliminated and remain. This surface state after etching the ohmic contact layer (not shown) is shown in FIG. 6C. These coexisting first and second metal layers 35 and 37 of the step portion "A" are referred to as a metal residue. The metal residue causes inferiority such as a point defect or a spot in subsequent processes.

On the other hand, the first, second and third metal layers for the source and drain electrodes and the data line are etched with a mixed acid solution at a time. However, a galvanic phenomenon (electro-chemical reaction) occurs due to the mixed acid solution during the etching process. As the first and third layers become thicker, the galvanic phenomenon affects much more. Specifically, as the first metal layer is thicker than the third metal layer, the second metal layer is more over-etched. Accordingly, a sidewall of the triple layer has an inverse taper shape. This phenomenon will be explained with respect to FIG. 7.

FIG. 7 is a magnified cross-sectional view of a portion "D" of FIG. 4D. As shown in FIG. 7, a second metal layer 37 of Al between first and third metal layers 35 and 39 of Mo is over-etched. Accordingly, when a passivation layer 51 is formed on an entire surface of the substrate (not shown), the passivation layer 51 does not completely cover the second metal layer 37 due to the inverse taper shape "E" of the sidewall.

SUMMARY OF THE INVENTION

Accordingly, the present invention is directed to a liquid crystal display device that substantially obviates one or more of problems due to limitations and disadvantages of the related art.

An object of the present invention is to prevent inferiority generated when source and drain electrodes, and a data line have a multiple layer.

An advantage of the present invention is to provide a fabricating method of an array substrate for a liquid crystal display device where a production yield is improved.

Another advantage of the present invention is to provide a fabricating method of an array substrate for a liquid crystal display device of a large size and a high resolution.

Additional features and advantages of the invention will be set forth in the description that follows, and in part will be apparent from the description, or may be learned by practice of the invention. Other advantages of the invention will be realized and attained by the structure particularly pointed out in the written description and claims hereof as well as the appended drawings.

To achieve these and other advantages and in accordance with the purpose of the present invention, as embodied and broadly described, an array substrate for a liquid crystal display device includes: a substrate; a gate electrode and a gate line on the substrate; a gate insulating layer on the gate electrode and the gate line; an active layer on the gate insulating layer; an ohmic contact layer on the active layer; source and drain electrodes and a data line on the ohmic contact layer, the source and drain electrodes and the data line having a multiple metal layer; a passivation layer on the source and drain electrodes and the data line; and a pixel electrode on the passivation layer.

In another aspect, an array substrate for a liquid crystal display device includes: a substrate; a gate electrode and a gate line on the substrate; a gate insulating layer on the gate electrode and the gate line; an active layer on the gate insulating layer; an ohmic contact layer on the active layer; source and drain electrodes and a data line on the ohmic contact layer, the source and drain electrodes and the data line having a multiple metal layer; a passivation layer on the source and drain electrodes and the data line; and a pixel electrode on the passivation layer, wherein an oxide film is formed between first and second metal layers of the multiple metal layer.

In another aspect, a fabricating method of an array substrate for a liquid crystal display device includes: forming a gate electrode and a gate line on a substrate; forming a gate insulating layer on the gate electrode and the gate line; forming an active layer on the gate insulating layer; forming an ohmic contact layer on the active layer; depositing a first metal layer of a multiple metal layer on the ohmic contact layer; plasma-treating the first metal layer; sequentially depositing the other metal layers of the multiple metal layer on the first layer; patterning the multiple metal layer to form source and drain electrodes and a data line; forming a passivation layer on the source and drain electrodes and the data line; and forming a pixel electrode on the passivation layer.

In another aspect, an array substrate for a liquid crystal display device includes: a substrate; a gate electrode and a gate line on the substrate; a gate insulating layer on the gate electrode and the gate line; an active layer on the gate insulating layer; an ohmic contact layer on the active layer; source and drain electrodes and a data line on the ohmic contact layer, the source and drain electrodes and the data line including a first metal layer of chromium (Cr) and a second metal layer of aluminum (Al), the data line crossing the gate line; a passivation layer on the source and drain electrodes and the data line; and a pixel electrode on the passivation layer.

In another aspect, a fabricating method of an array substrate for a liquid crystal display device includes: forming a gate electrode and a gate line on a substrate; forming a gate insulating layer on the gate electrode; forming an active layer on the gate insulating layer; forming an ohmic contact layer on the active layer; sequentially depositing a first metal layer of chromium (Cr), a second metal layer of aluminum (Al) and a third metal layer of molybdenum (Mo) on the ohmic contact layer; patterning the first, second and third metal layers to form source and drain electrodes and a data line crossing the gate line; forming a passivation layer on the source and drain electrodes and the data line; and forming a pixel electrode on the passivation layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included herewith to provide a further understanding of the invention and are incorporated in and constitute a part of this specification, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, similar reference numbers will be used throughout the drawings to refer to the same or like parts.

A structure and a method to prevent a metal residue remaining during depositing and patterning process of three metal layers are illustrated in FIGS. 8 to 14.

Figure 8:
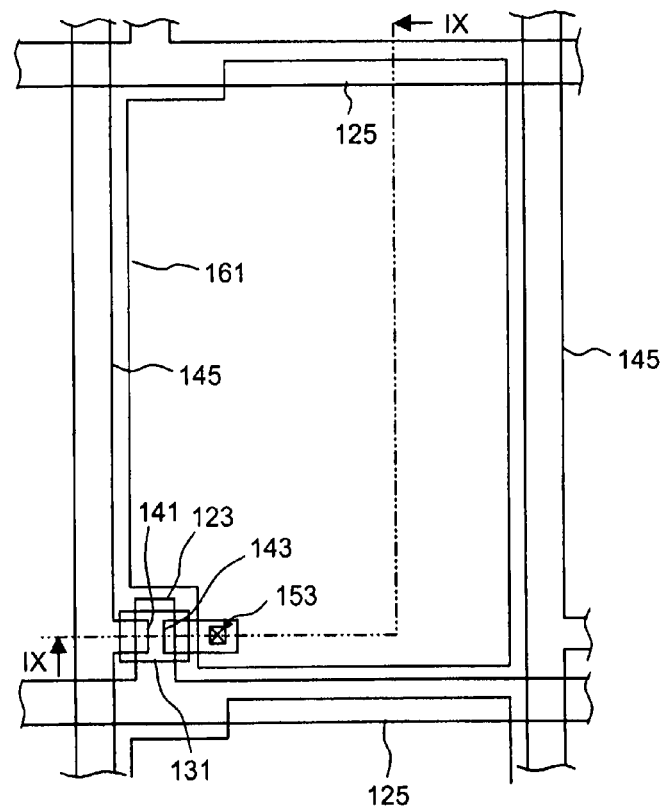
FIG. 8 is a schematic plan view of an array substrate for a liquid crystal display device according to an exemplary embodiment of the present invention.
Figure 9:
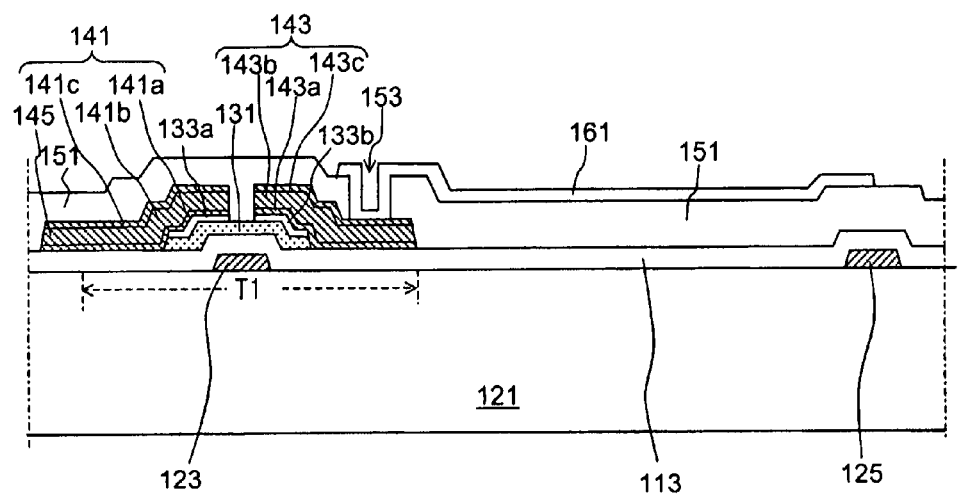
FIG. 9 is a schematic cross-sectional view taken along a line IX-IX of FIG. 8.

FIG. 8 is a schematic plan view of an array substrate for a liquid crystal display device according to an exemplary embodiment of the present invention, and FIG. 9 is a schematic cross-sectional view taken along a line IX-IX of FIG. 8.

In FIGS. 8 and 9, a gate line 125 and a gate electrode 123 of a metallic material are formed on a substrate 121. The gate electrode 123 extends from the gate line 125. A gate insulating layer 113 of silicon nitride (SiNx) or silicon oxide ($SiO_2$) is formed on the gate line 125 and the gate electrode 123. An active layer 131 of amorphous silicon is formed on the gate insulating layer 113 over the gate electrode 123, and an ohmic contact layer 133a and 133b of impurity-doped amorphous silicon is formed on the active layer 131. Source and drain electrodes 141 and 143 of a metallic material are formed on the ohmic contact layer 133a and 133b. At the same time, a data line 145 crossing the gate line 125 is formed on the gate insulating layer 113. The source electrode 141 extends from the data line 145. The source and drain electrodes 141 and 143 constitute a thin film transistor (TFT) "T1" with the gate electrode 123. Here, the source and drain electrodes 141 and 143 and the data line 145 have a triple metal layer including a first metal layer 141a, 143a and 145a, a second metal layer 141b, 143b and 145b, and a third metal layer 141c, 143c and 145c. For example, the first metal layer 141a, 143a and 145a includes chromium (Cr), the second metal layer 141b, 143b and 145b includes aluminum-neodymium (AlNd) alloy, and the third metal layer 141c, 143c and 145c includes molybdenum (Mo). A passivation layer 151 having a drain contact hole 153 is formed on the source and drain electrodes 141 and 143, and the data line 145. The drain contact hole 153 exposes the drain electrode 143. A pixel electrode 161 of a transparent conductive material is formed on the passivation layer 151. The pixel electrode 161 is connected to the drain electrode 143 through the drain contact hole 153. The pixel electrode 161 overlaps a portion of the gate line 125, thereby constituting a storage capacitor.

FIGS. 10A to 10E are schematic cross-sectional views illustrating a fabricating process of an array substrate for a liquid crystal display device according to an exemplary embodiment of the present invention. FIGS. 10A to 10E are also taken along a line IX-IX of FIG. 8.

Figure 10A:
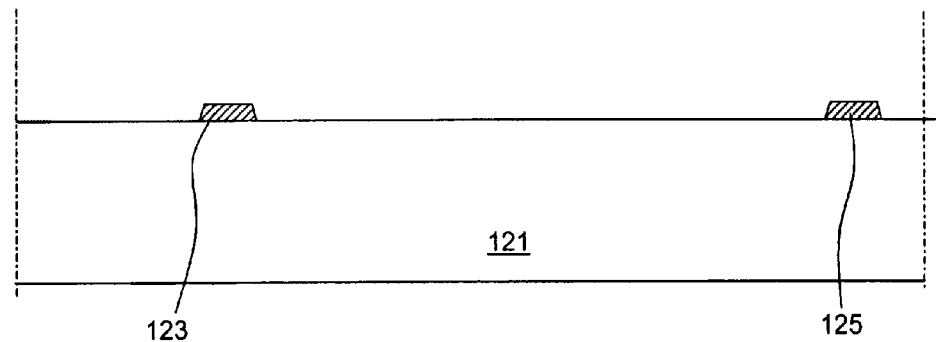
FIGS. 10A to 10E are schematic cross-sectional views illustrating a fabricating process of an array substrate for a liquid crystal display device according to an exemplary embodiment of the present invention.

In FIG. 10A, a gate line 125 and a gate electrode 123 are formed on a substrate 121 through depositing and patterning a metallic material.

Figure 10B:
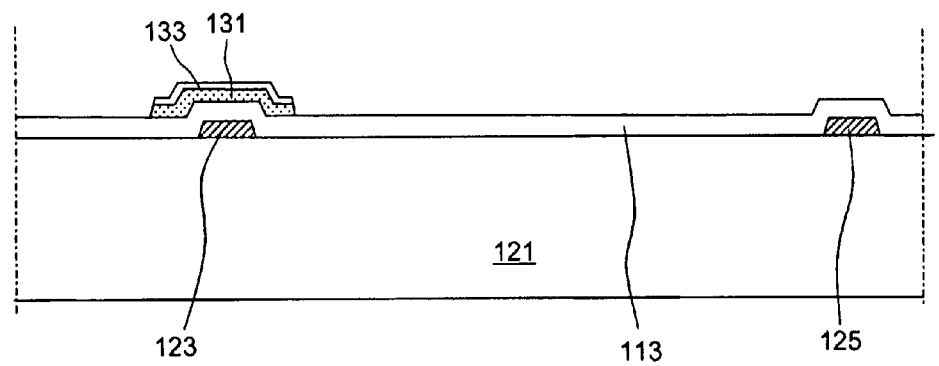

In FIG. 10B, after forming a gate insulating layer 113 on the gate line 125 and the gate electrode 123, an active layer 131 and an ohmic contact layer 133 are formed on the gate insulating layer 113 over the gate electrode 123 through depositing and patterning amorphous silicon and impurity-doped amorphous silicon sequentially.

Figure 10C:
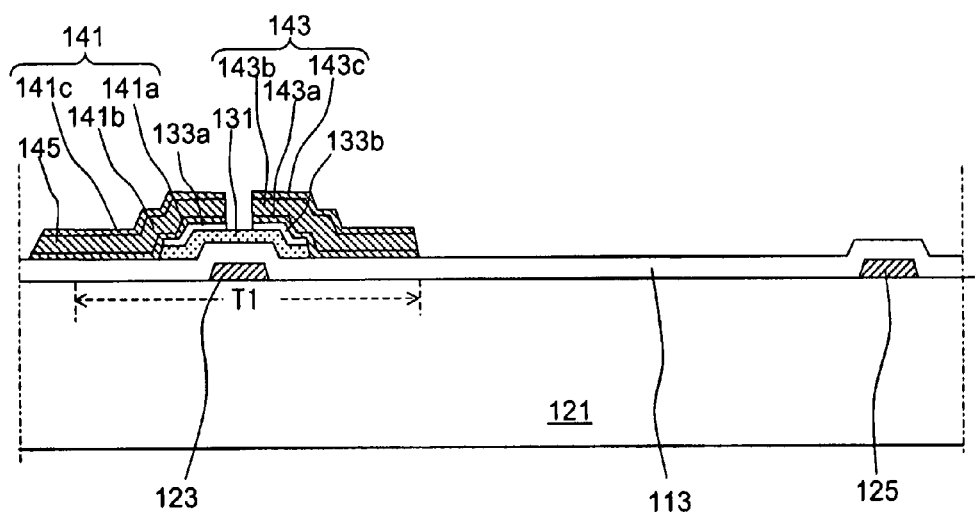

In FIG. 10C, source and drain electrodes 141 and 143 are formed on the ohmic contact layer 133 through depositing and patterning a first metal layer 141a and 143a, a second metal layer 141b and 143b, and a third metal layer 141c and 143c sequentially. Accordingly, the source and drain electrodes 141 and 143 have a triple metal layer and the process of forming the source and drain electrodes 141 and 143 will be illustrated in detail hereafter. At the same time, a data line 145 connected to the source electrode 141 is formed on the gate insulating layer 113. Next, the ohmic contact layer 133a and 133b is completed through etching the ohmic contact layer 133 (of FIG. 10B) between the source and drain electrodes 141 and 143.

Figure 10D:
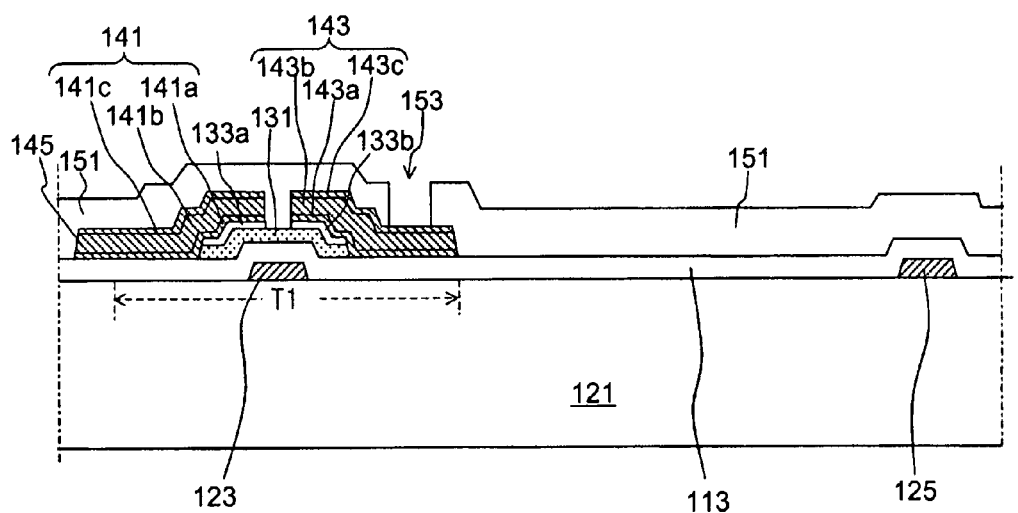

In FIG. 10D, a passivation layer 151 of inorganic or organic insulating material is formed on the source and drain electrodes 141 and 143. The passivation layer 151 has a drain contact hole 153 exposing the drain electrode 143.

Figure 10E:
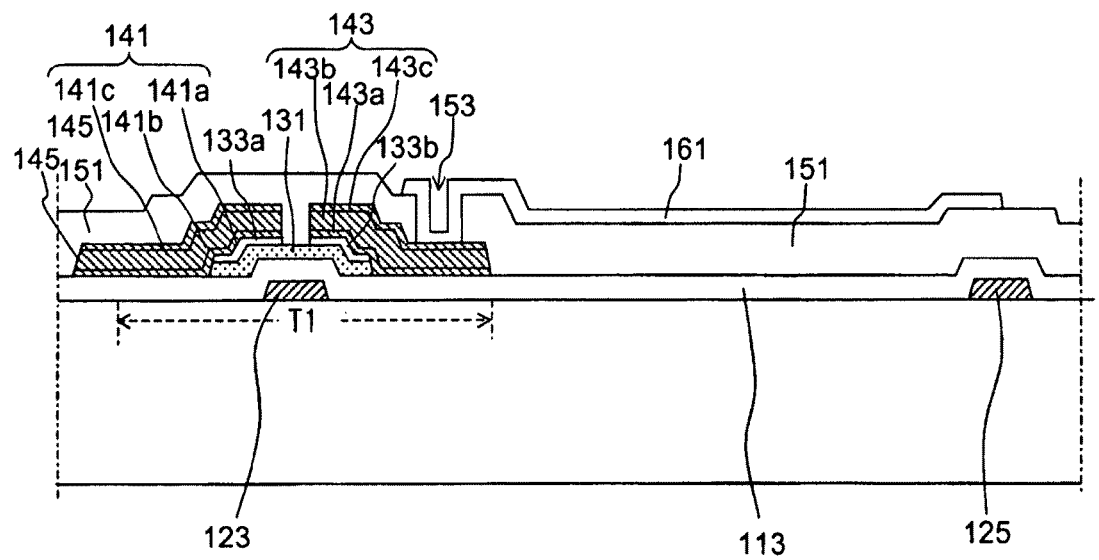

In FIG. 10E, a pixel electrode 161 is formed on the passivation layer 151 though depositing and patterning a transparent conductive material such as indium-tin-oxide (ITO) or indium-zinc-oxide (IZO). The pixel electrode 161 contacts the drain electrode 143 through the drain contact hole 153 and overlaps a portion of the gate line 125.

Figure 11A:
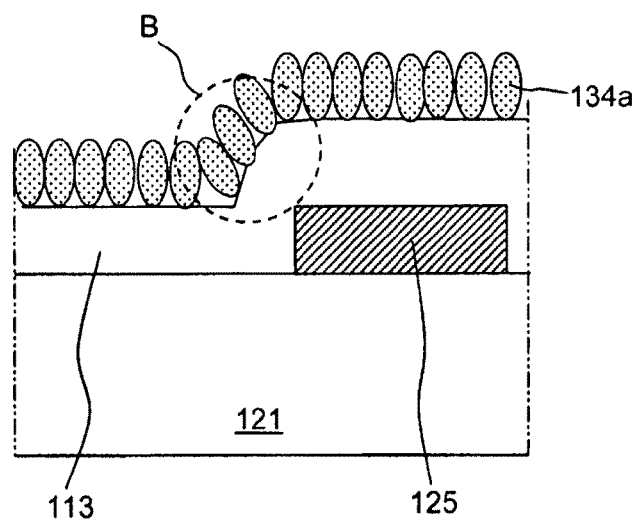
FIGS. 11A to 11C are schematic cross-sectional views illustrating a process of forming source and drain electrodes according to an exemplary embodiment of the present invention.
Figure 11B:
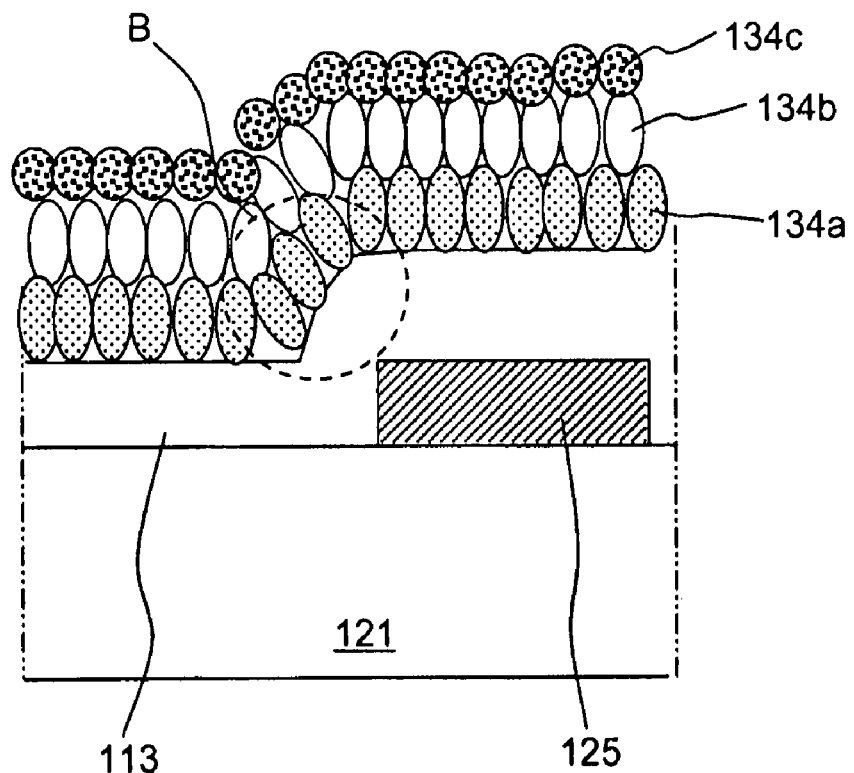
Figure 11C:
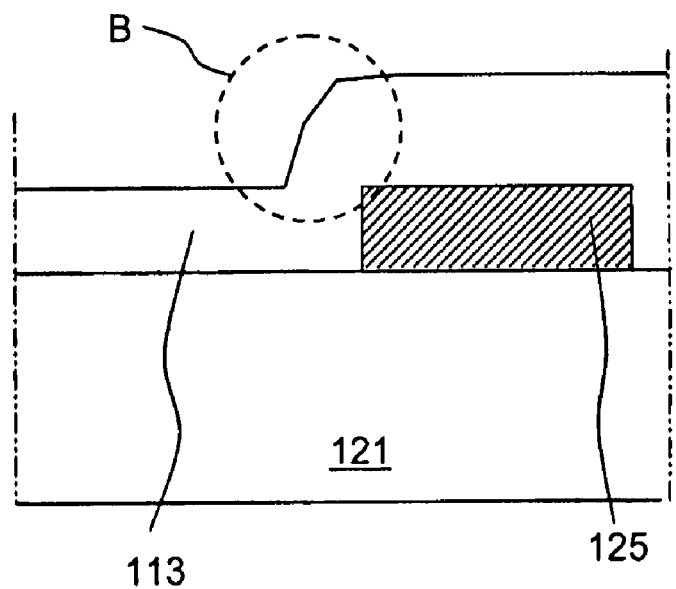

FIGS. 11A to 11C are schematic cross-sectional views illustrating a process of forming source and drain electrodes according to an exemplary embodiment of the present invention. Here, the source and drain electrodes are formed through a photolithographic process where a photoresist (PR) pattern is formed on a triple metal layer, and then the triple metal layer is etched using the PR pattern as an etching mask. FIGS. 11A to 11C illustrate a portion where the PR pattern is not formed.

In FIG. 11A, a first metal layer 134a is deposited on an entire surface of the substrate 121 including a gate line 125 and a gate insulating layer 113. Here, the first metal layer has a thickness within a range of about 100 Å to about 1000 Å to increase a density at a step portion "B." The first metal layer 134a includes one of titanium (Ti), chromium (Cr), tantalum (Ta), molybdenum (Mo), molybdenum-tungsten (MoW) and alloy thereof.

In FIG. 11B, second and third metal layers 134b and 134c are sequentially deposited on the first metal layer 134a. Since the density of the first metal layer 134a at the step portion "B" increases, the second metal layer 134b does not diffuse into the first metal 134a during the deposition process of the second metal layer 134b. The second metal layer 134b includes aluminum (Al) or aluminum (Al) alloy. The third metal layer includes molybdenum (Mo).

After a PR pattern (not shown) is formed on the third metal layer 134c, the third, second and first metal layers 134c, 134b and 134a are sequentially etched using the PR pattern as an etching mask. Next, after an ohmic contact layer between source and drain electrodes is etched, the PR pattern is removed. As shown in FIG. 11C, the entire triple metal layer at the step portion "B" is etched, and a metal residue does not remain.

Figure 12:
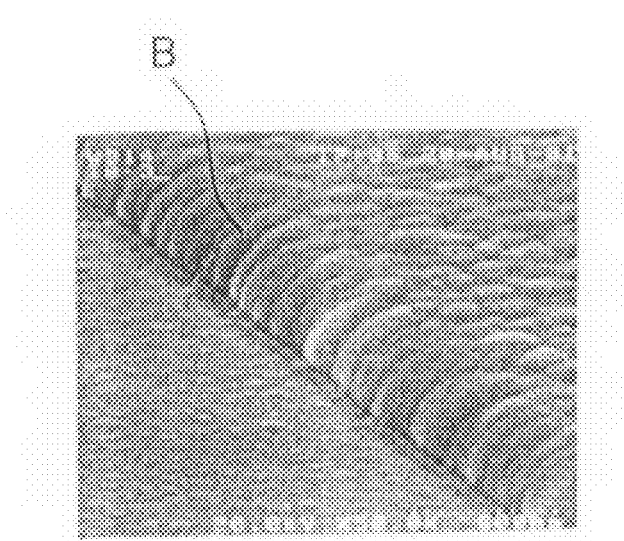
FIG. 12 is a scanning electron microscope (SEM) image illustrating a step portion "B" after stripping a PR pattern.

FIG. 12 is a scanning electron microscope (SEM) image illustrating a step portion "B" after stripping a PR pattern. As shown in FIG. 12, the entire triple metal layer is eliminated and no metal residue remains.

This process of forming source and drain electrodes can be applied when the source and drain electrodes have a double metal layer.

FIGS. 13A to 13D are schematic cross-sectional views illustrating a process of forming source and drain electrodes according to another exemplary embodiment of the present invention. Like the above embodiment, the source and drain electrodes are formed through a photolithographic process where a photoresist (PR) pattern is formed on a triple metal layer and then the triple metal layer is etched using the PR pattern as an etching mask. FIGS. 13A to 13D illustrate a portion where the PR pattern is not formed.

Figure 13A:
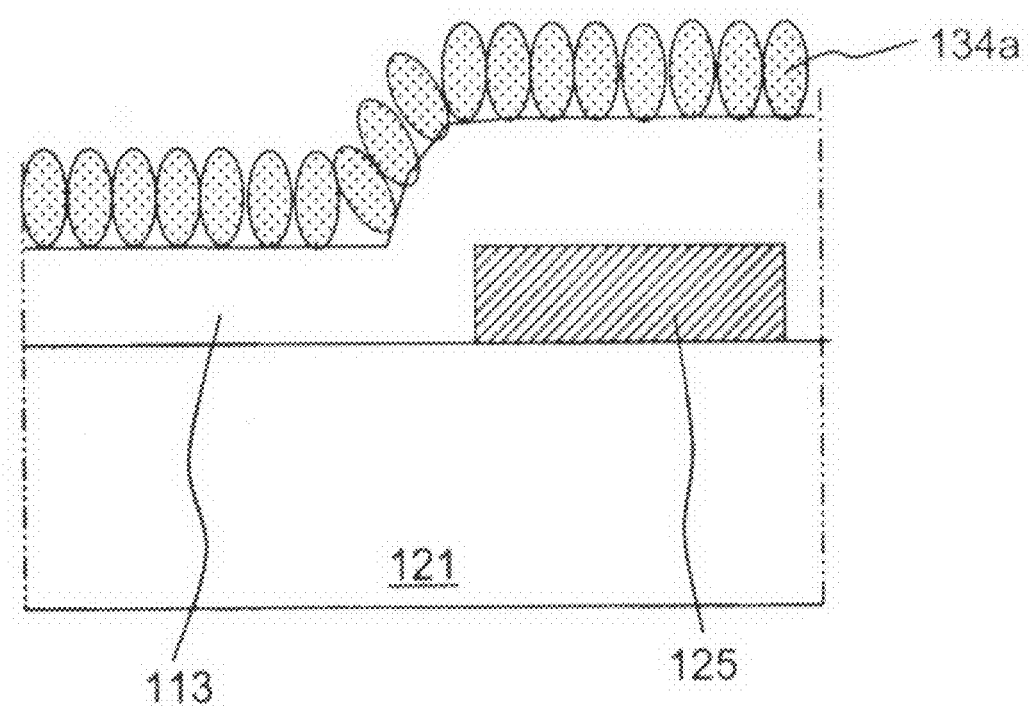
FIGS. 13A to 13D are schematic cross-sectional views illustrating a process of forming source and drain electrodes according to another exemplary embodiment of the present invention.

In FIG. 13A, a first metal layer 134a is deposited on an entire surface of a substrate 121 including a gate line 125 and a gate insulating layer 113. Here, the thickness of the first metal layer 134a is not limited and the first metal layer 134a includes one of titanium (Ti), chromium (Cr), tantalum (Ta), molybdenum (Mo), molybdenum-tungsten (MoW), and alloy thereof.

Figure 13B:
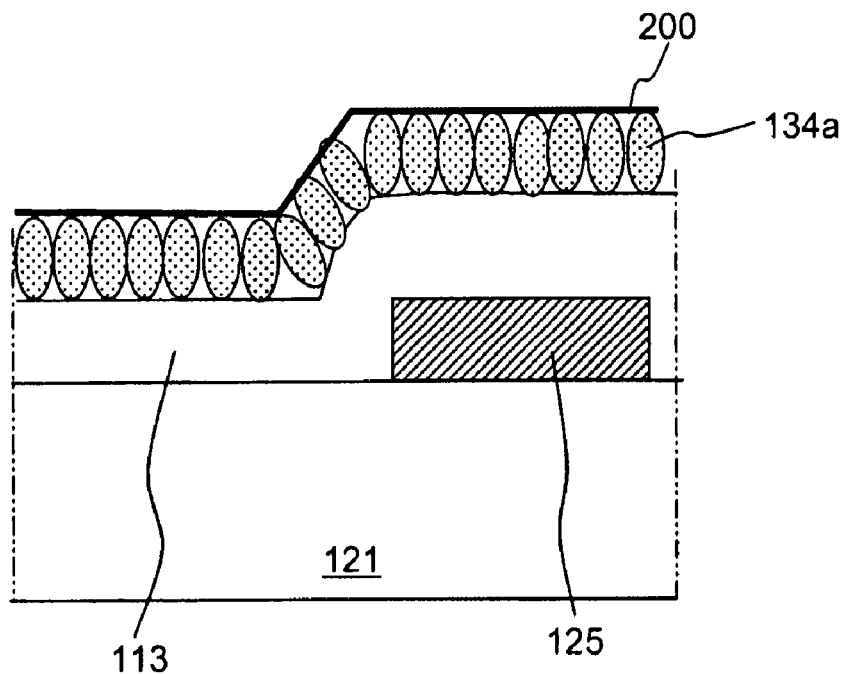

In FIG. 13B, since the first metal layer 134a is exposed to an oxygen ($O_2$) plasma so that a thin metal oxide film 200 is formed on the first metal layer 134a. The metal oxide film 200 has a thickness less than about 50 Å. The plasma-treating may use one of direct current (DC) plasma, radio frequency (RF) plasma and a combination of DC and RF plasma.

Figure 13C:
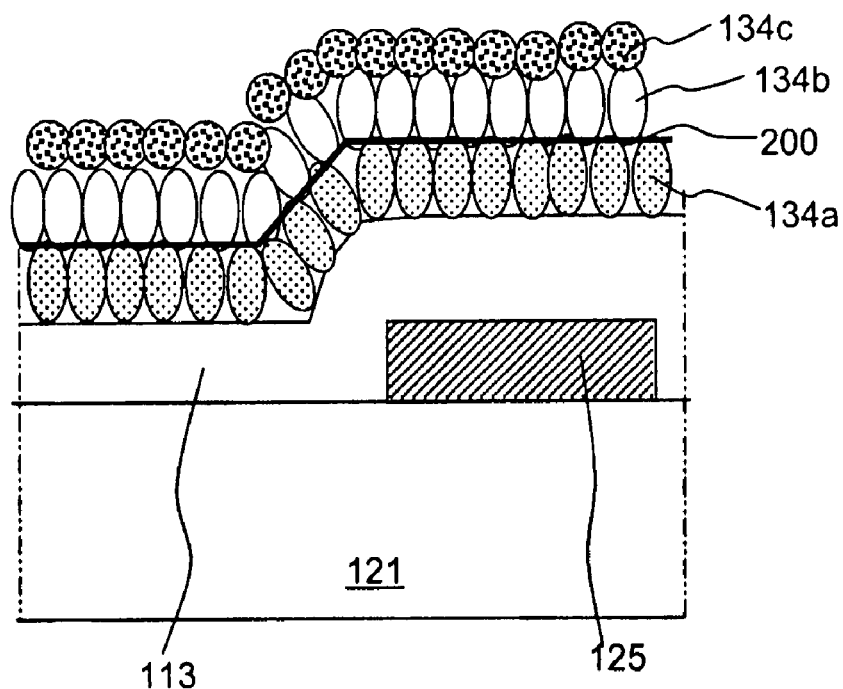

In FIG. 13C, second and third metal layers 143b and 143c are sequentially deposited on the metal oxide film 200. Since the metal oxide film 200 is formed on the first metal layer 143a, the second metal layer 143b does not diffuse into the first metal layer 143a during the deposition process of the second metal layer 134b. The second metal layer 134b includes aluminum (Al) or aluminum (Al) alloy. The third metal layer includes molybdenum (Mo).

Figure 13D:
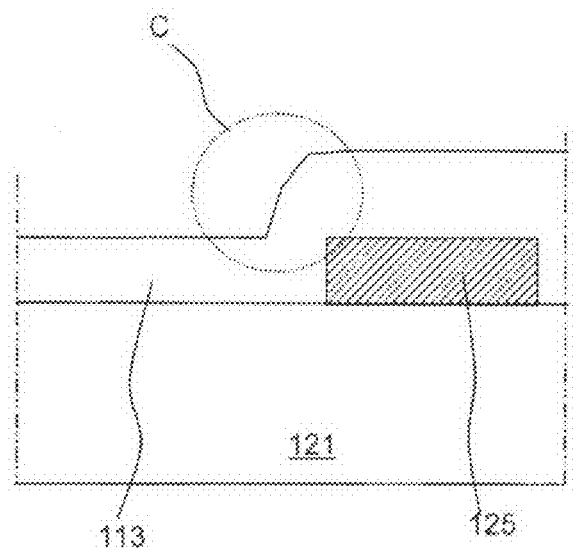

After a PR pattern (not shown) is formed on the third metal layer 134c, the third, second and first metal layers 134c, 134b and 134a are sequentially etched using the PR pattern as an etching mask. Next, after an ohmic contact layer between source and drain electrodes is etched, the PR pattern is removed. As illustrated in FIG. 13D, the entire triple metal layer at the step portion "C" is etched, and a metal residue does not remain.

Figure 14:
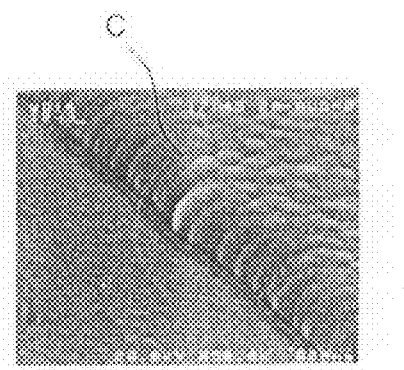
FIG. 14 is a scanning electron microscope (SEM) image illustrating a step portion "C" after stripping a PR pattern.

FIG. 14 is a scanning electron microscope (SEM) image illustrating a step portion "C" after stripping a PR pattern. As shown in FIG. 14, the entire triple metal layer is eliminated and no metal residue remains.

In this embodiment, even when the first metal layer has a thickness less than about 100 Å, a metal residue at a step portion of the gate insulating layer is prevented.

On the other hand, a structure and a method to prevent a sidewall of a triple layer form having an inverse taper shape are illustrated in FIGS. 15A to 15H.

Figure 1:
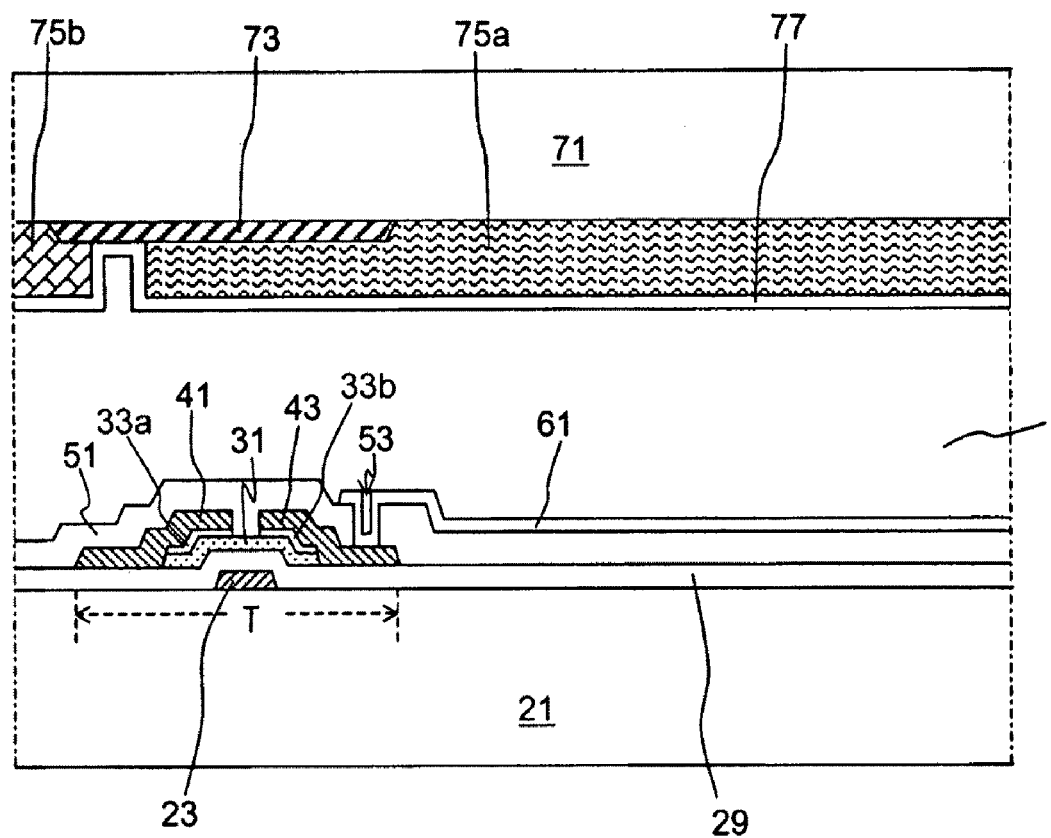
FIG. 1 is a schematic cross-sectional view of a related art liquid crystal display device.
Figure 2:
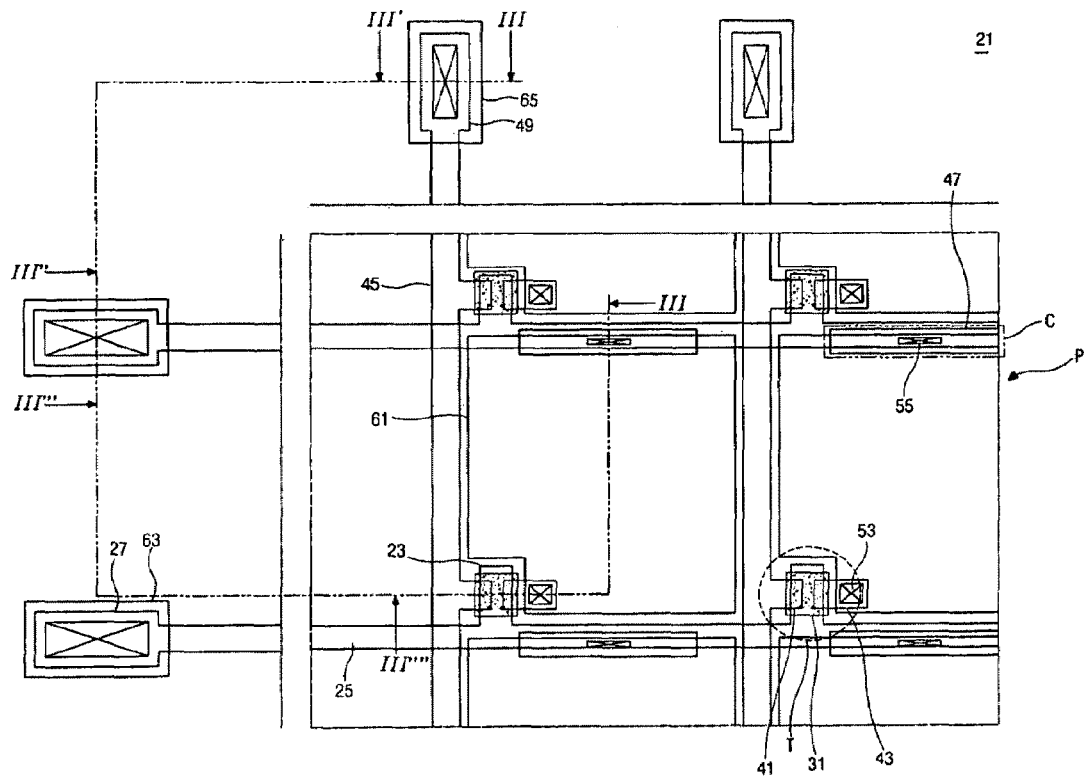
FIG. 2 is a schematic plan view of an array substrate for a related art liquid crystal display device.
Figure 3:
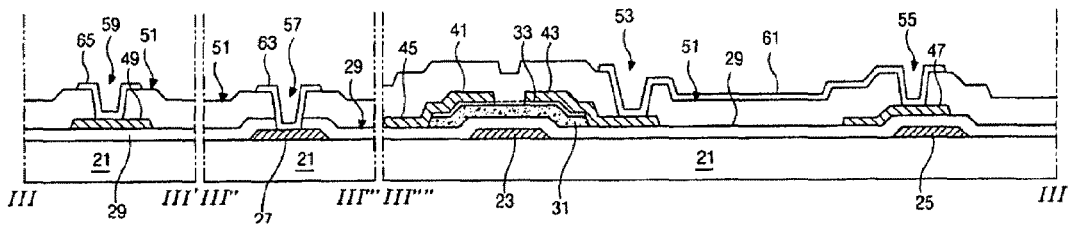
FIG. 3 is a schematic cross-sectional view taken along the line III-III of FIG. 2.
Figure 4A:
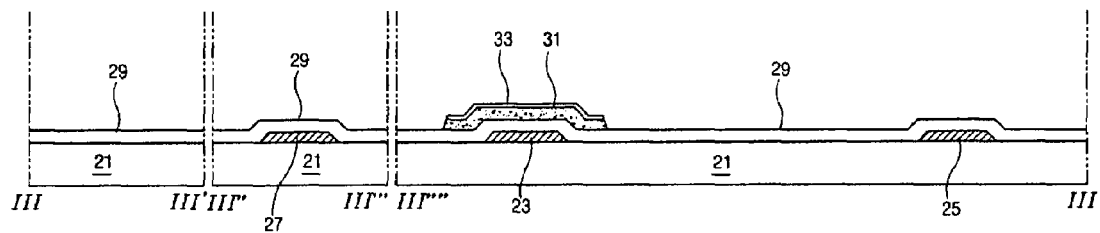
FIGS. 4A to 4E are schematic cross-sectional views illustrating a fabricating process of an array substrate using a triple layer.
Figure 4B:
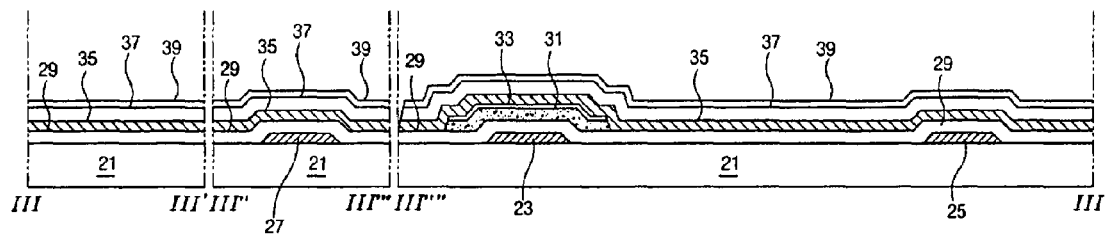
Figure 4C:
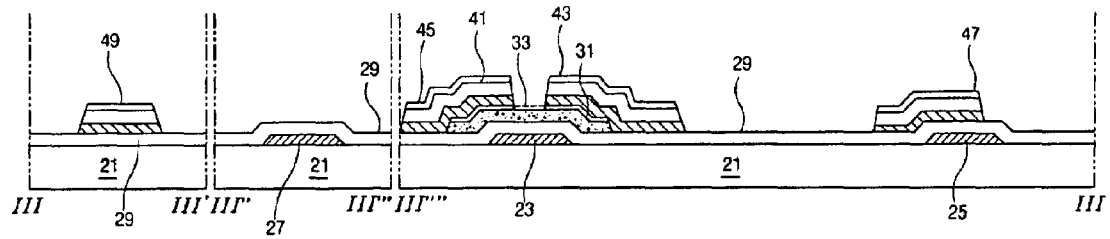
Figure 4D:
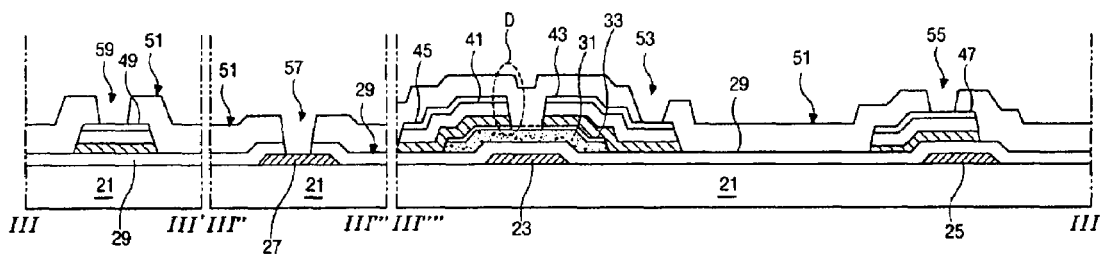
Figure 4E:
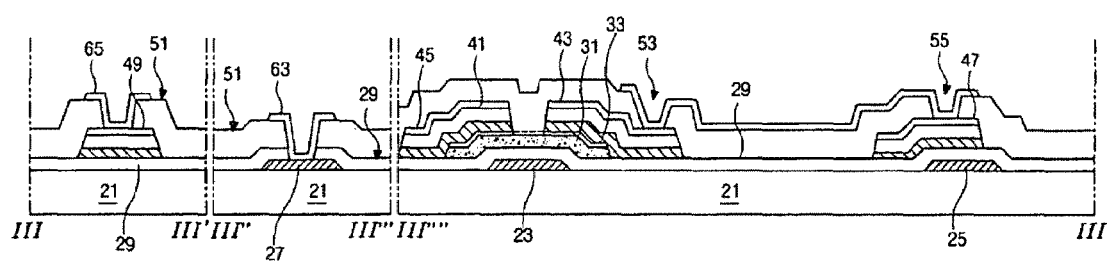
Figure 5A:
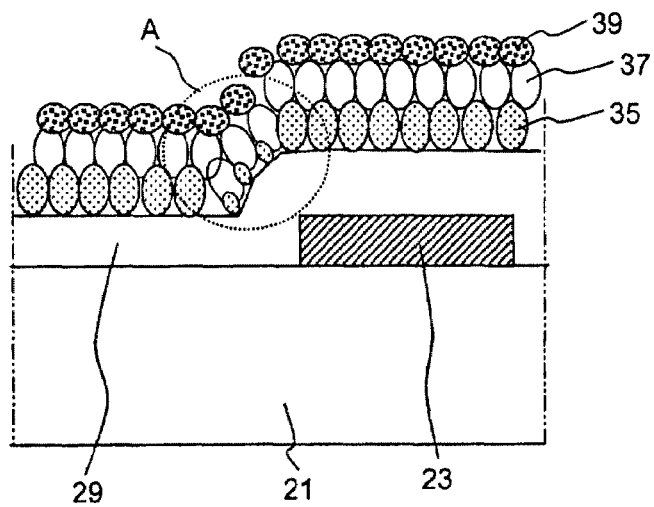
FIGS. 5A to 5D are schematic cross-sectional views illustrating a metal residue generation of three metal layers.
Figure 5B:
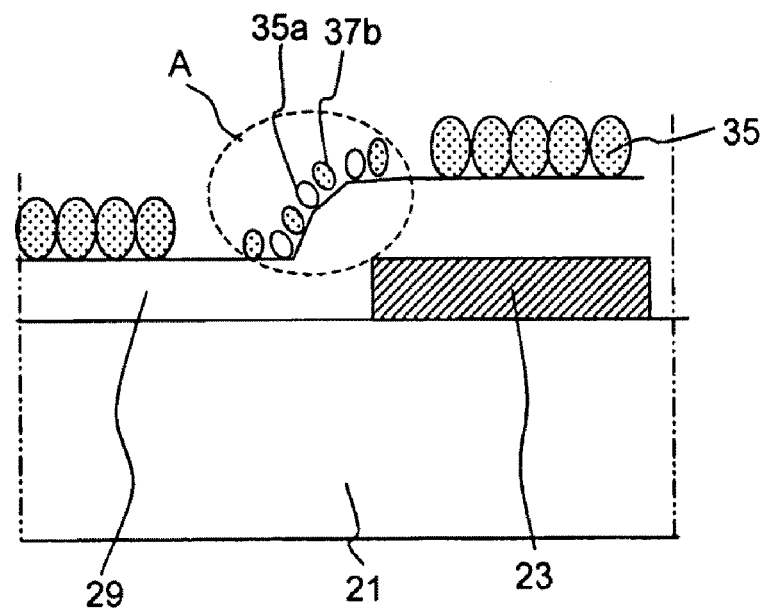
Figure 5C:
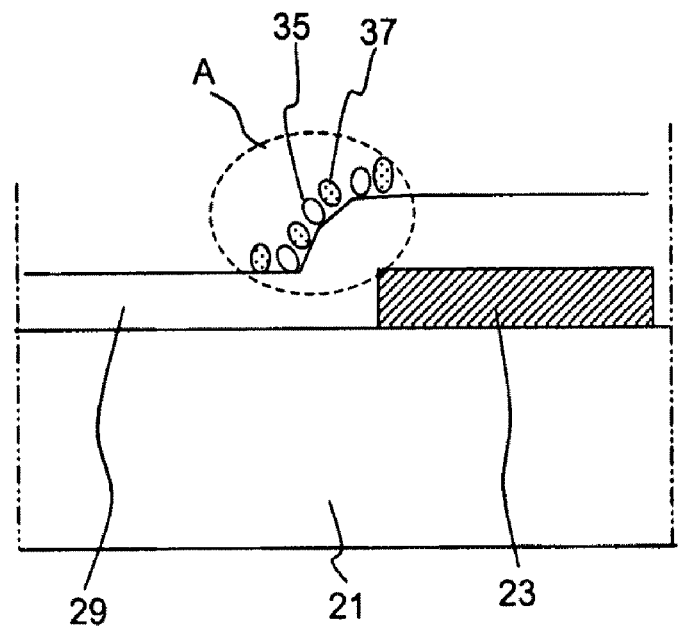
Figure 5D:
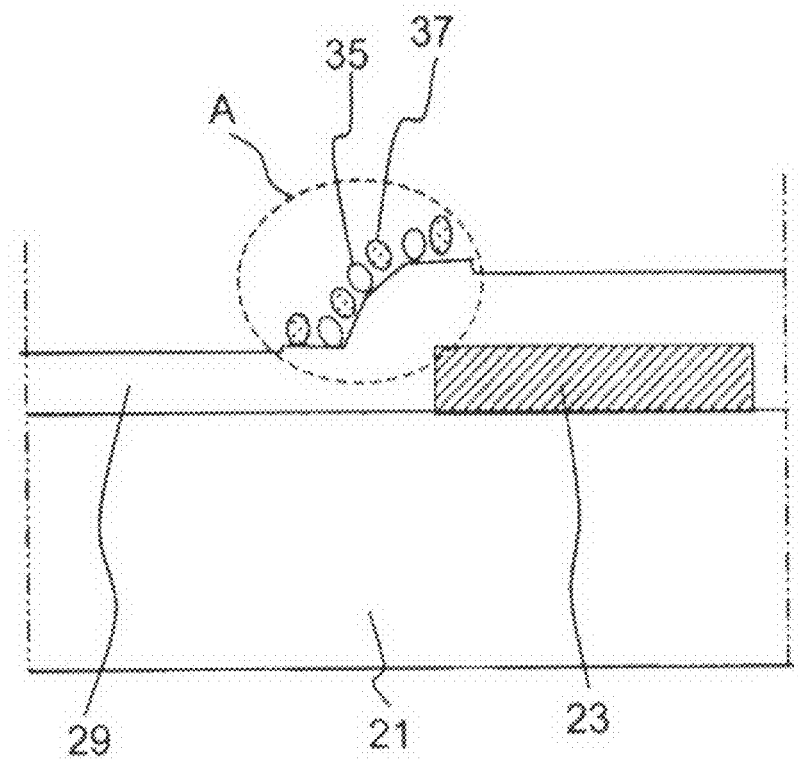
Figure 6A:
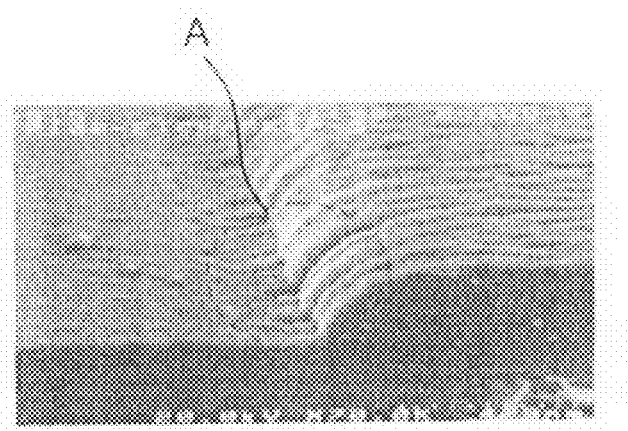
FIGS. 6A to 6C are scanning electron microscope (SEM) images showing a surface state according to a step of a patterning process.
Figure 6B:
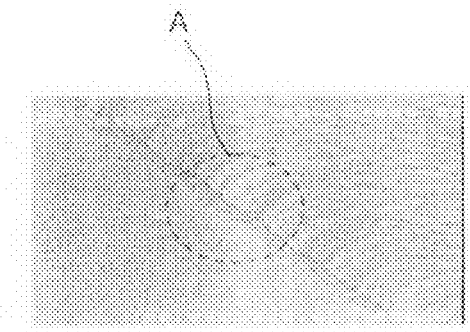
Figure 6C:
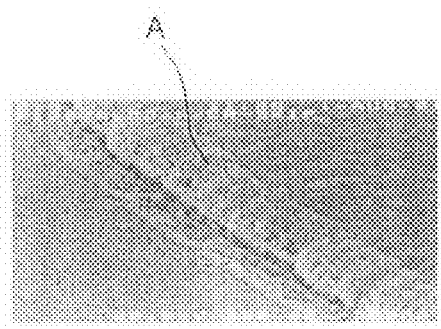
Figure 7:
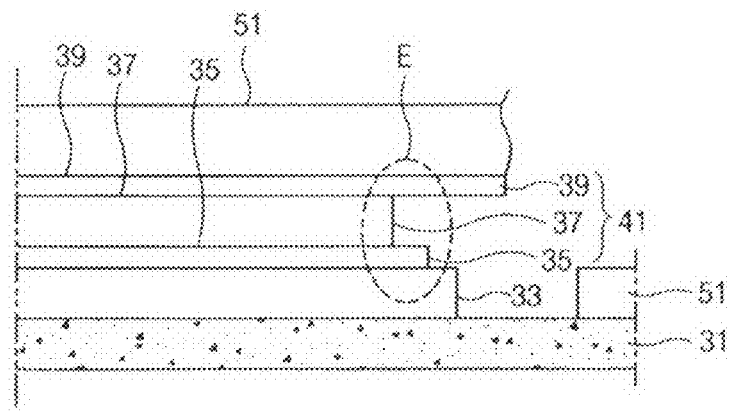
FIG. 7 is a magnified cross-sectional view of a portion "D" of FIG. 4D.

FIGS. 15A to 15H are schematic cross-sectional views illustrating a fabricating process of a liquid crystal display device according to an exemplary embodiment of the present invention. FIGS. 15A to 15H are also taken along a line III-III of FIG. 2.

Figure 15A:
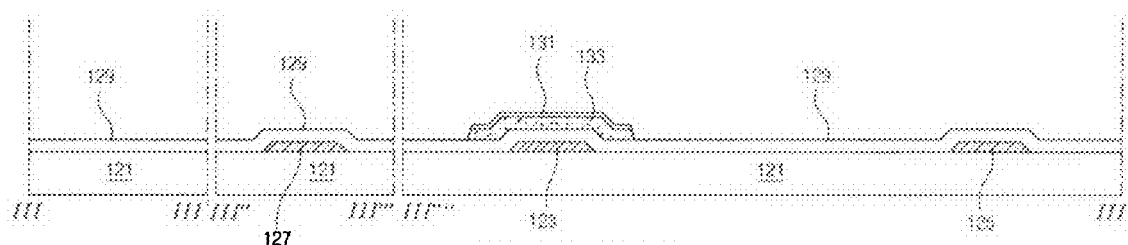
FIGS. 15A to 15H are schematic cross-sectional views illustrating a fabricating process of a liquid crystal display device according to an exemplary embodiment of the present invention.

In FIG. 15A, a gate electrode 123, a gate line 125 and a gate pad 127 at one end of the gate line 125 are formed on a substrate 121. The gate electrode 123 may be a single layer including one of aluminum (Al), aluminum alloy, molybdenum (Mo), chromium (Cr) and tungsten (W) or a double layer including two of the above-mentioned metallic materials. Generally, when the gate electrode 123 is a double layer, an aluminum (Al) layer and molybdenum (Mo) layer (or a Cr layer) are used as a lower first metal layer and an upper second metal layer, respectively. Even though aluminum has low resistance, aluminum is susceptible to chemicals and line defect due to a hillock occurring in a subsequent high temperature process. Accordingly, Mo or Cr having high corrosion resistance is used as the second metal layer on the first metal layer. A gate insulating layer 129, i.e., a first insulating layer, is formed on an entire surface of the substrate 121. The gate insulating layer 129 has one of an inorganic insulating material including silicon nitride (SiNx) and silicon oxide ($SiO_2$). An active layer 131 and an ohmic contact layer 133 of an island shape are formed on the gate insulating layer 129 over the gate electrode 123. The active layer 131 and the ohmic contact layer 133 include intrinsic amorphous silicon (a–Si:H) and impurity-doped amorphous silicon (n+a–Si:H), respectively.

Figure 15B:
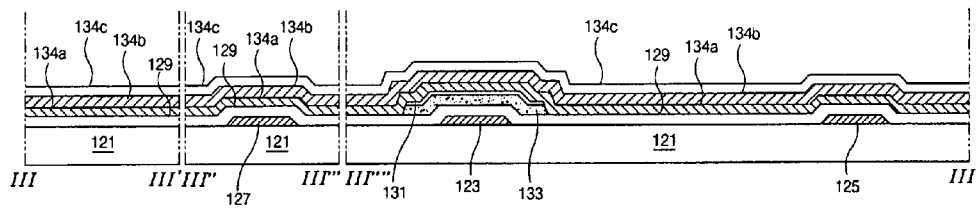

In FIG. 15B, a first metal layer 134a of Cr, a second metal layer 134b of Al or Al alloy, and a third metal layer 134c of Mo are sequentially formed on an entire surface of the substrate 121. Here, the first and second metal layers 134a and 134b may be sequentially deposited without breaking a vacuum, or the second and third metal layers 134b and 134c may be sequentially deposited without breaking a vacuum. Accordingly, a contamination between the first and second metal layers 134a and 134b or between the second and third metal layers 134b and 134c can be prevented, and a process time can be reduced. The first metal layer 134a is used to prevent a spiking in which the second metal layer 134b penetrates the active layer 131 or the ohmic contact layer 133. The third metal layer 134c is used to reduce a contact resistance between the second metal layer 134b and a pixel electrode (not shown) of a subsequent process. A function of the third metal layer 134c is illustrated in following drawings in detail.

Figure 15C:
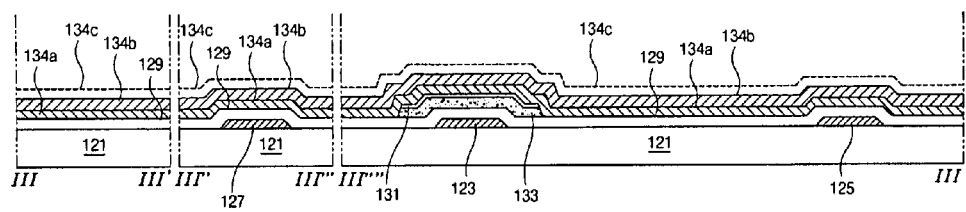

In FIG. 15C, the third metal layer 134c of Mo is etched without using an etching mask. However, the third metal layer 134c is not completely etched and minutely remains on the second metal layer 134b of Al. The remaining third metal layer reduces a contact resistance between a drain electrode (not shown) and a pixel electrode (not shown) of subsequent processes. If the third metal layer 134c of Mo remains with a specific thickness, a galvanic phenomenon between the third metal layer 134c of Mo and the first metal layer 134a of Cr occurs, and the first metal layer 134a of Cr cannot be normally etched. Accordingly, the third metal layer 134c of Mo is nearly completely etched without using an etching mask. A first etching solution to etch the third metal layer 134c can include hydrogen peroxide ($H_2O_2$).

Figure 15D:
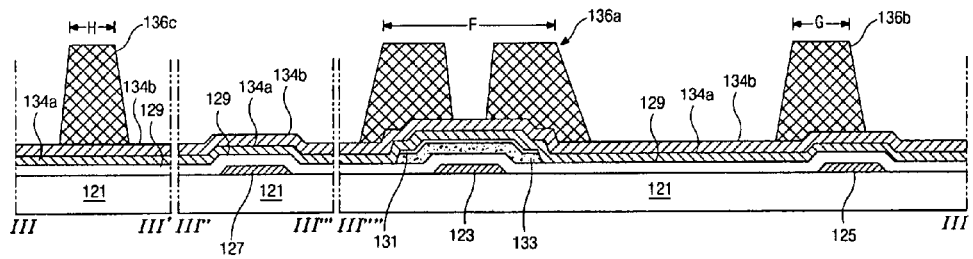

In FIG. 15D, photoresist (PR) patterns 136a, 136b and 136c, respectively shielding a source-drain region "F," a storage capacitor region "G" and a data pad region "H", are formed on the second metal layer 134b of Al through a photolithographic process.

Figure 15E:
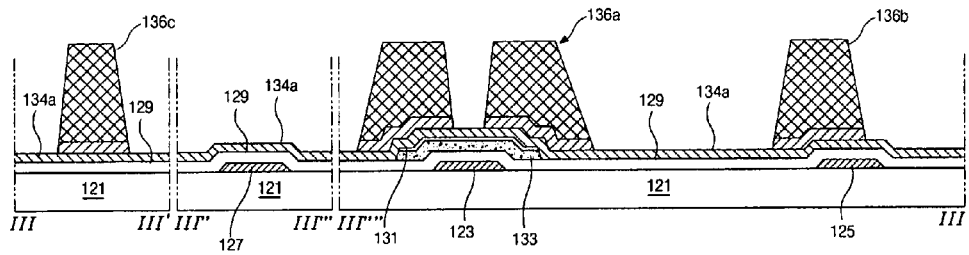

In FIG. 15E, the second metal layer 134b of Al between the PR patterns 136a, 136b and 136c is etched by using a second etching solution of a mixed acid solution.

Figure 15F:
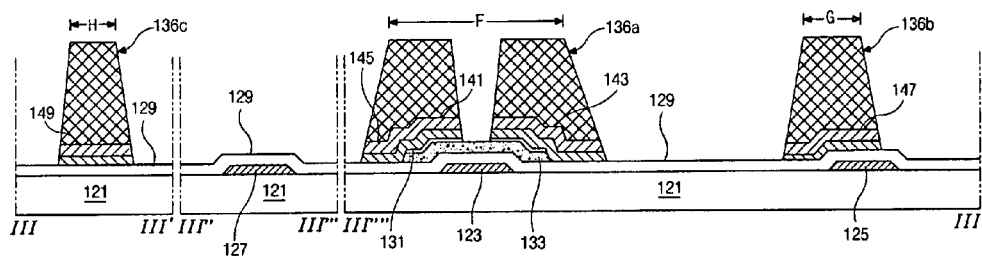

In FIG. 15F, the first metal layer 134a of Cr is etched by using a third etching solution including $Ce(NH_4)_2(NO_3) + HNO_3$ (CAN).

Source and drain electrodes 141 and 143, a data line 145, a data pad 149 and a source-drain metal layer 147 are formed through the etching processes illustrated in FIGS. 15C to 15F. The source and drain electrodes 141 and 143 are spaced apart from each other. The source electrode 141 is connected to the data line 145, and the data pad 149 is disposed at one end of the data line 145. The source-drain metal layer 147 of an island shape is formed on the gate insulating layer 129 over a portion of the gate line 125. Sequentially, the active layer 133 is exposed through etching the ohmic contact layer 133 between the source and drain electrodes 141 and 143. Next, the PR patterns 136a, 136b and 136c on the source and drain electrodes 141 and 143, the source-drain metal layer 147 and the data pad 149 are removed. Thus, the first, second and third metal layers 143a, 143b and 143c can be etched by using one photolithographic process.

Figure 15G:
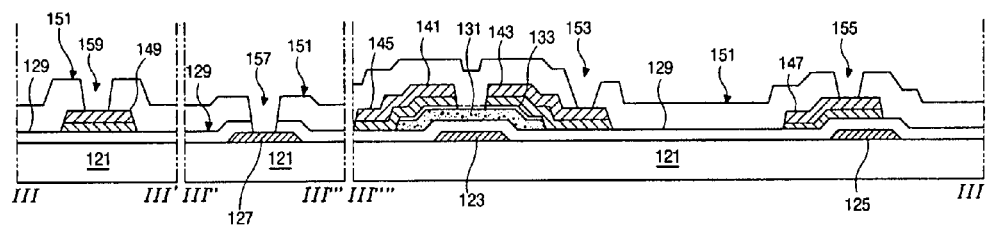

In FIG. 15G, a passivation layer 151, i.e., a second insulating layer is formed on an entire surface of the substrate 121 through depositing one of an inorganic insulating material group including silicon nitride (SiNx) and silicon oxide ($SiO_2$) or coating one of an organic insulating material group including benzocyclobutene (BCB) and acrylic resin. The passivation layer 151 includes has a drain contact hole 151 therethrough exposing the drain electrode 143, a capacitor contact hole 155 therethrough exposing the source-drain metal layer 147, a gate pad contact hole 159 therethrough exposing the gate pad 127, and a data pad contact hole 159 therethrough exposing the data pad 149.

Figure 15H:
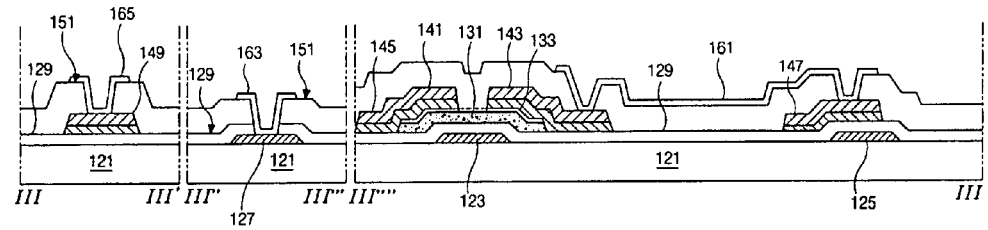

In FIG. 15H, a pixel electrode 161, a gate pad terminal 163 and a data pad terminal 165 are formed on the passivation layer 151 through deposing and patterning one of a transparent conductive metal including indium-tin-oxide (ITO) and indium-zinc-oxide (IZO). The pixel electrode 161 is connected to the drain electrode 141 and the source-drain metal layer 147. The gate pad terminal 163 and the data pad terminal 165 are connected to the gate pad 127 and the data pad 149, respectively. As mentioned above, since the third metal layer 134c of Mo minutely remains on the second metal layer 143b of Al, the contact resistance between each second metal layer and each transparent conductive electrode can be reduced. When aluminum is exposed to air, aluminum is oxidized to form a natural oxide layer on its surface. The natural oxide layer degrades a contact property between an aluminum layer and an ITO layer, thereby interfering with the flow of signals. Therefore, the minutely remaining third metal layer of Mo prevents generation of the natural oxide layer and reduces a contact resistance between the aluminum layer and the ITO layer. Moreover, chromium (Cr) is used as a material of the first metal layer to prevent an over-etch of the second metal layer by the mixed acid solution due to a galvanic phenomenon between the third and second metal layers.

In the present invention, when a triple metal layer is applied to source and drain electrodes, a metal residue at a step portion can be prevented by forming a first metal layer thicker than a specific thickness or by forming an oxide film on a first metal layer. Moreover, good source and drain electrodes pattern can be obtained by entirely etching a third metal layer and sequentially etching second and third metal layers with different etchant. Therefore, liquid crystal display devices having a large size and a high resolution can be obtained with a high production yield.

It will be apparent to those skilled in the art that various modifications and variations can be made in the method of manufacturing a flat panel display device of the present invention without departing from the spirit or scope of the invention. Thus, it is intended that the present invention cover the modifications and variations of this invention provided they come within the scope of the appended claims and their equivalents.

What is claimed is:

1. An array substrate for a liquid crystal display device, comprising:
   a substrate;
   a gate electrode and a gate line on the substrate;
   a gate insulating layer on the gate electrode and the gate line;
   an active layer on the gate insulating layer;
   an ohmic contact layer on the active layer;
   source and drain electrodes and a data line on the ohmic contact layer, the source and drain electrodes and the data line having multiple metal layers;
   a passivation layer on the source and drain electrodes and the data line; and
   a pixel electrode on the passivation layer,
   wherein an oxide film is formed between first and second metal layers of the multiple metal layers, and wherein the first and second metal layers do not contact each other with the oxide film therebetween.

2. The substrate according to claim 1, wherein the oxide film is a metal oxide film.

3. The substrate according to claim 2, wherein the metal oxide film has a thickness less than about 50 Å.

4. An array substrate for a liquid crystal display device, comprising:
   a substrate;
   a gate electrode and a gate line on the substrate;
   a gate insulating layer on the gate electrode and the gate line;
   an active layer on the gate insulating layer;
   an ohmic contact layer on the active layer;
   source and drain electrodes and a data line on the ohmic contact layer, the source and drain electrodes and the data line having multiple metal layers including a first metal layer of chromium (Cr), a second metal layer of aluminum (Al), and a third metal layer of molybdenum (Mo), wherein the third metal layer has a thickness less than about 100 Å;
   a passivation layer on the source and drain electrodes and the data line; and
   a pixel electrode on the passivation layer.

5. The substrate according to claim 4, further comprising a gate pad connected to the gate line.

6. The substrate according to claim 4, further comprising a data pad connected to the data line.

7. The substrate according to claim 4, further comprising a source-drain metal layer on the gate insulating layer over a portion of the gate line.

8. The substrate according to claim 7, wherein the source-drain metal layer is connected to the pixel electrode through a contact hole through the passivation layer.

9. The substrate according to claim 4, wherein the source and drain electrodes and the data line further includes a third metal layer of molybdendum (Mo) on the second metal layer.

* * * * *